United States Patent
Salvat et al.

(10) Patent No.: US 6,412,276 B1
(45) Date of Patent: Jul. 2, 2002

(54) REGENERATION SYSTEM FOR A DIESEL ENGINE EXHAUST GAS PARTICULATE FILTER

(75) Inventors: Olivier Salvat, Paris; Jacques Portalier, Boulogne; Patrice Le Tallec, Sartrouville, all of (FR)

(73) Assignee: Peugeot Citroen Automobiles SA, Neuilly sur Seinc (FR)

( * ) Notice: Subject to any disclaimer, the term of this patent is extended or adjusted under 35 U.S.C. 154(b) by 0 days.

(21) Appl. No.: 09/701,837

(22) PCT Filed: Apr. 5, 2000

(86) PCT No.: PCT/FR00/00859
§ 371 (c)(1),
(2), (4) Date: Dec. 5, 2000

(87) PCT Pub. No.: WO00/60228
PCT Pub. Date: Oct. 12, 2000

(30) Foreign Application Priority Data

Apr. 6, 1999 (FR) .............................................. 99 04274

(51) Int. Cl.$^7$ ................................................ F01N 3/00
(52) U.S. Cl. ............................ 60/295; 60/280; 60/286; 60/311; 60/284; 60/605.2
(58) Field of Search .......................... 60/284, 286, 311, 60/602, 605.2, 280, 295; 55/DIG. 30

(56) References Cited

U.S. PATENT DOCUMENTS

| 4,685,290 A | | 8/1987 | Kamiya et al. |
| 4,719,751 A | | 1/1988 | Kume et al. |
| 4,835,964 A | * | 6/1989 | Kume et al. .................. 60/285 |
| 5,758,496 A | * | 6/1998 | Rao et al. ...................... 60/297 |
| 5,802,846 A | * | 9/1998 | Bailey ........................ 60/605.2 |
| 5,826,425 A | | 10/1998 | Sebastiano et al. |
| 5,974,791 A | * | 11/1999 | Hirota et al. .................. 60/286 |
| 6,023,930 A | * | 2/2000 | Abe et al. ...................... 60/311 |
| 6,032,461 A | * | 3/2000 | Kinugasa et al. ............. 60/295 |
| 6,041,591 A | * | 3/2000 | Kaneko et al. ................ 60/284 |
| 6,199,374 B1 | * | 3/2001 | Hirota et al. .................. 60/277 |

FOREIGN PATENT DOCUMENTS

JP 7-259533 10/1995

* cited by examiner

Primary Examiner—Thomas Denion
Assistant Examiner—Diem Tran
(74) Attorney, Agent, or Firm—Connolly Bove Lodge & Hutz LLP

(57) ABSTRACT

A regeneration aid system (4) for a particulate filter integrated into the exhaust line (2) of a diesel engine of a motor vehicle, comprising means (5) for injecting fuel into at least some of the cylinders of the engine (1) during the expansion stage thereof in order to cause an increase, without any modification of engine torque as requested by the user, in the temperature of the exhaust gas therein, so that regeneration aid can be provided with respect to the filter, characterized in that the means of injection (5) are adapted in order to result in several fuel injections in calibrated amounts spread out in time during the expansion stage.

3 Claims, 2 Drawing Sheets

REGENERATION SYSTEM FOR A DIESEL ENGINE EXHAUST GAS PARTICULATE FILTER

FIELD OF THE INVENTION

The present invention relates to a system for assisting with the regeneration of a particulates filter incorporated into the exhaust line of an engine, particularly of a motor vehicle.

BACKGROUND OF THE INVENTION

It is known that one of the most outstanding concerns of equipment manufacturers and motor vehicle manufacturers is that of reducing the pollution caused by the operation of their engines.

This is particularly true of diesel engines.

Various solutions have therefore been envisaged in an attempt at reducing the level of pollution of these engines.

Thus, for example, it has already been proposed in the state of the art that particulates filters be incorporated into the exhaust lines of these diesel engines.

These filters are therefore designed to trap the particulates or soot contained in the exhaust gases of these engines and to burn them during a filter regeneration phase.

Various means for assisting with the regeneration of these filters have already been developed in the prior art.

Now it is known that the natural regeneration temperature for soot is at around about 550 to 600° C.

Now, these temperatures can be achieved only when these engines are running under very high load conditions.

To make regeneration easier at light load, these particulates filters may be combined with oxidation catalytic converters arranged upstream of them.

The prior art has also developed other systems for assisting with the regeneration of these filters and which comprise means of injecting fuel into the cylinders of the engine while these are on their expansion stroke, in order to raise the temperature of the exhaust gases so as to assist with regenerating the filter.

The development of these systems is associated with the emergence of systems for the common supply of fuel to the cylinders of the engines, also known as common rail injection systems.

However, these systems do display a certain number of drawbacks, particularly as far as the impact that this post-injection has on the engine torque supplied.

What happens is that such post-injection results in relatively significant fluctuations in engine torque, and this has a corresponding detrimental effect on the driveability of the vehicle.

BRIEF DESCRIPTION OF THE INVENTION

The object of the invention is therefore to solve these problems.

To this end, the subject of the invention is a system for assisting with the regeneration of a particulates filter incorporated into an exhaust line of an engine, particularly of a motor vehicle, of the type comprising means of injecting fuel into at least some of the cylinders of the engine while these are on their expansion stroke, in order to raise the temperature of the exhaust gases therein so as to assist with regenerating the filter, characterized in that the injection means are designed to inject a number of shots of fuel, in metered amounts distributed over time during the expansion stroke, in that the engine is associated with a turbocompressor and in that the system comprises means for regulating the boost pressure of the turbocompressor so as to reduce the amount of air entering the engine.

The invention will be better understood from reading the description which will follow, given merely by way of example and made with reference to the appended drawings, in which:

DETAILED DESCRIPTION OF THE INVENTION

Figure 1:
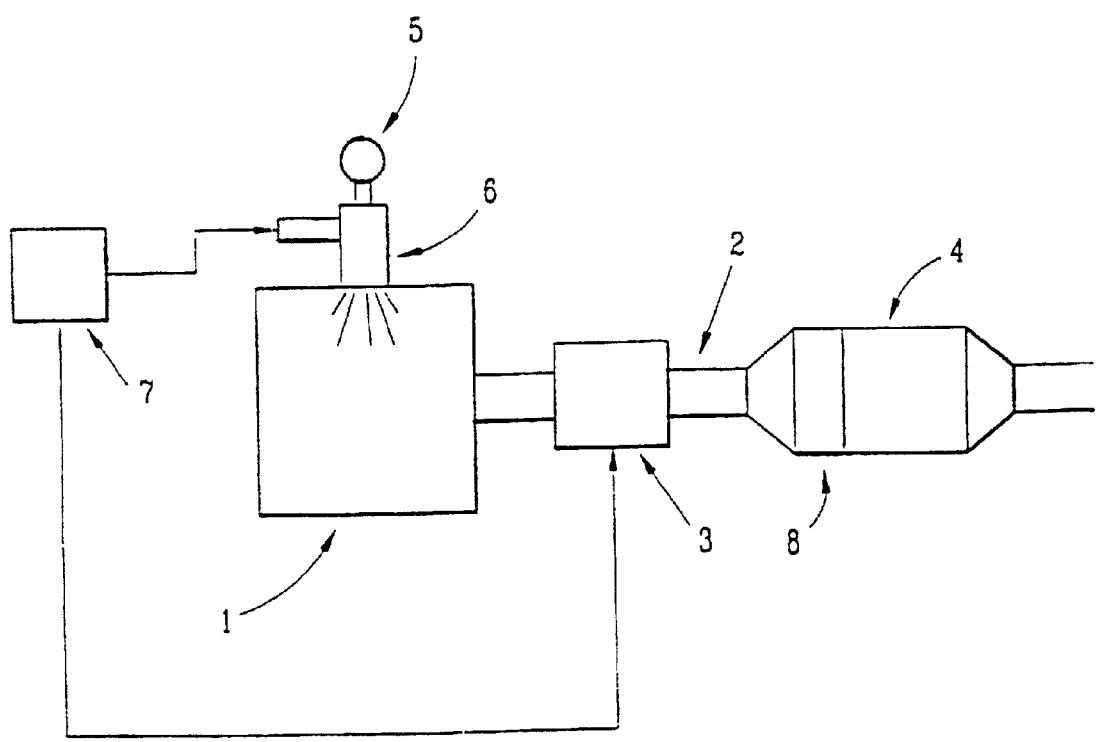
FIG. 1 depicts a block diagram illustrating the structure of a system for assisting with the regeneration of a filter according to the invention.

A system for assisting with the regeneration of a particulates filter incorporated into an exhaust line of a diesel engine, particularly of a motor vehicle can, in fact, be discerned in FIG. 1.

In that figure, the engine is denoted by the general reference 1 and its exhaust gases are made to flow along an exhaust line denoted by the general reference 2.

This exhaust line may or may not be associated with a turbocompressor denoted by the general reference 3 and the gases therefore pass through this turbocompressor and, more particularly, through the turbine portion thereof.

Thereafter, the gases are made to flow through a particulates filter denoted by the general reference 4 in this FIG. 1.

The engine is also associated with a fuel supply system denoted by the general reference 5 in this figure, this supply system for example comprising a system for the common supply of all the cylinders of the engine, of the common rail type, comprising, for each cylinder of the engine, an injector, for example electrically operated, such as the one denoted by the general reference 6 in this figure.

These injectors are controlled via a central data processing unit denoted by the general reference 7.

The particulates filter denoted by the general reference 4 may also be associated with an oxidation catalytic converter denoted by the general reference 8 in this figure, for assisting with its regeneration and located upstream of this filter in the exhaust line.

According to the invention, the fuel injection means are designed to inject several shots of fuel in calibrated quantities distributed over time during the expansion stroke of at least some of the cylinders.

Figure 2:
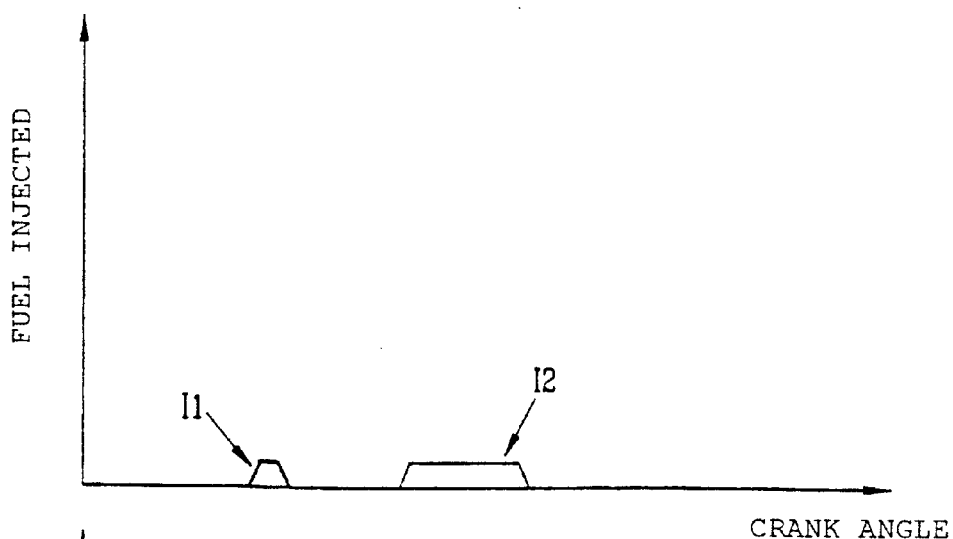
FIGS. 2, 3 and 4 illustrate the operation of such a system.
Figure 3:
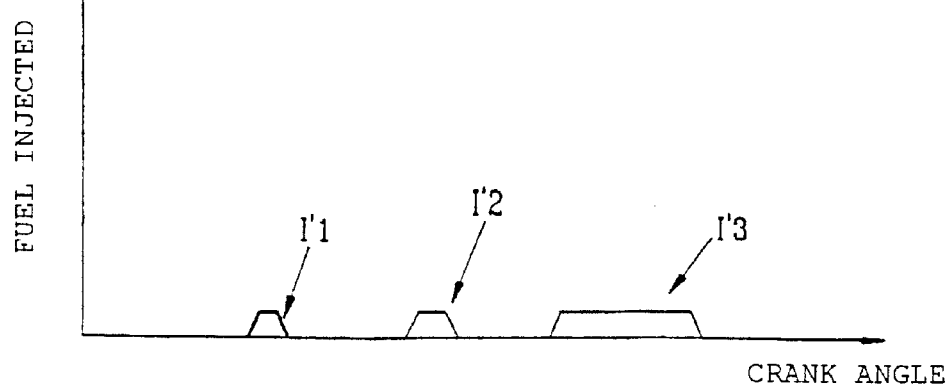
Figure 4:
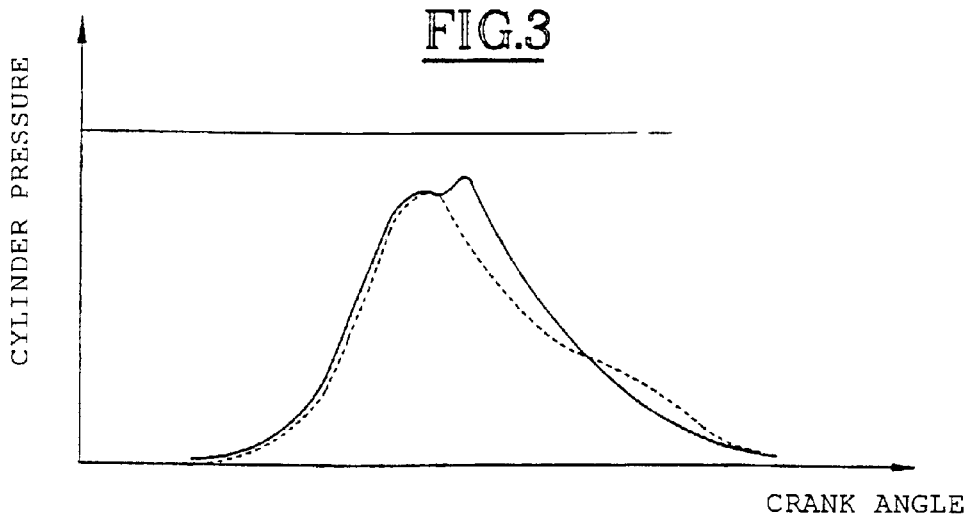

This therefore makes it possible to increase the temperature of the exhaust gases to help with the regeneration of the filter and to do so without having an appreciable impact on the torque supplied by the engine, as illustrated in particular in FIGS. 2, 3 and 4.

Specifically, FIG. 2 demonstrates that during a phase in which the engine is operating without assisted regeneration, the fuel is injected in two stages, namely a so-called pilot injection I1 which prepares for the main injection I2 which follows.

During a phase of operation with assisted regeneration of the filter, the objective is to prolong combustion for as long as possible without altering the engine torque, in order to obtain higher gas temperatures in the combustion chamber when the exhaust valve opens so as to increase the temperature of the soot and trigger its combustion in the particulates filter.

To do that, and as illustrated in FIG. 3, the fuel may be injected in calibrated quantities into at least some of the cylinders, for example in three stages, namely a first, so-called pilot, injection I'1 identical to I1, a second injection I'2 which generates the thermodynamic conditions favorable to a third injection I'3 and provides some of the torque required by the user.

The amount of fuel injected during the injection I'2 is smaller or very much smaller than that injected during the injection I2, the timing of I'2 being identical to or retarded with respect to that of I2.

The injection I'3 generates the remainder of the torque, allowing the torque required by the driver of the vehicle to be achieved, increases the temperature of the exhaust gases by continuing combustion late into the expansion phase and may also, depending on its setting, give rise to unburned hydrocarbons which will cause an additional increase in the temperature of the gases by virtue of catalytic combustion in the catalytic converter 8 placed upstream of the particulates filter.

To generate the level of heat required without altering the engine torque (FIG. 4), the quantity of fuel injected during injection I'3 is therefore very much greater than that injected during injection I'2 for operating points where the engine is at light load, greater than or equal to the latter injection for intermediate loads and lower than the latter injection for operating points where the engine is running at heavy load, the injection I'3 taking place after the injection I'2 with an angular shift which may range from 15 to 150° crank angle depending on the operating point.

It will be noted that in this example two injections are performed in succession as post-injection during the expansion stroke.

It of course goes without saying that a higher number of injections may be envisaged and that, for example, the injection I'3 may itself be broken down into two sub-injections with the purpose of generating additional engine torque, increasing the temperature of the gases and the hydrocarbons which will be burnt by the catalytic converter 8, this solution providing better control over operation than just one injection I'3.

However, in order not to alter the engine torque, it is also necessary, when the engine is associated with a turbocompressor as illustrated, that in addition to this multiple injection a specific boost pressure set point be applied to this turbocompressor to compensate for the increase in energy that the turbocompressor receives as a result of the increase in the thermal levels in the exhaust.

This new set point therefore reduces the flowrate of air entering the engine, which has the effect of increasing the richness of the exhaust gases and also increases their temperature.

In this case, this set point may, for example, be delivered to the turbocompressor denoted by the general reference 3 in FIG. 1 by the central data processing unit 7.

It can therefore be appreciated that the system for assisting with regeneration according to the invention makes it possible to create the thermal levels needed for the combustion of soot in the filter without altering the engine torque.

These thermal levels are achieved for the same torque by prolonging combustion in the engine cycle by using multiple successive injections of fuel during the expansion stroke of at least some of the cylinders of this engine, it being possible for these injections to be associated with catalytic combustion hydrocarbons caused by these multiple injections in a catalytic converter and by a specific set point for regulating the boost pressure of a turbocompressor associated with the engine.

This then makes it possible to obtain regeneration of the particulates filters without detracting from the driveability of the vehicle, that is to say without sudden acceleration or deceleration thereof, when at light load or at intermediate load, where the thermal levels naturally achieved by the engine do not allow the combustion of soot.

It of course goes without saying that various embodiments of such a system may be envisaged.

What is claimed is:

1. A system for regenerating a particulates filter that is incorporated into a vehicle exhaust line, the system comprising:

means for injecting fuel into at least some cylinders of a vehicle engine while the cylinders undergo their expansion strokes consequently raising the temperature of exhaust gases that regenerate the filter;

means for injecting a number of metered shots of fuel into the cylinders during their expansion strokes;

a turbocompressor connected downstream of the engine; and means for regulating the boost pressure of the turbocompressor to reduce the amount of air entering the engine and consequently regulating engine torque during the injection of fuel into cylinders undergoing their expansion strokes.

2. The system as claimed in claim 1, further comprising an oxidation catalytic converter located upstream of the particulates filter.

3. The system as claimed in claim 1 further comprising means for commonly supplying fuel to all the cylinders.

* * * * *